Aug. 3, 1965  R. V. BEVERLY  3,197,914
FISHING FLOAT
Filed March 30, 1964
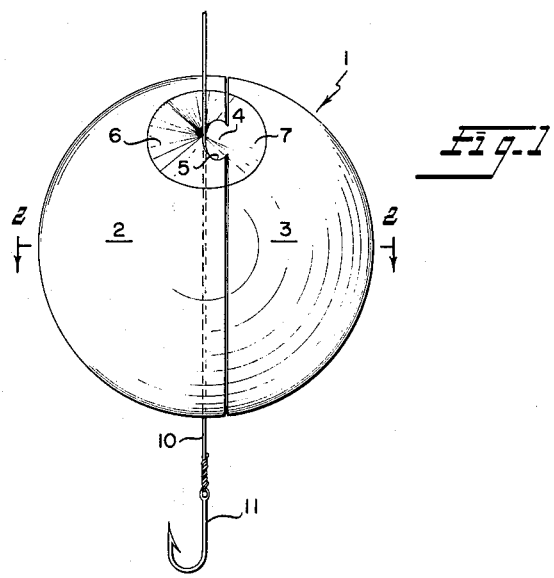
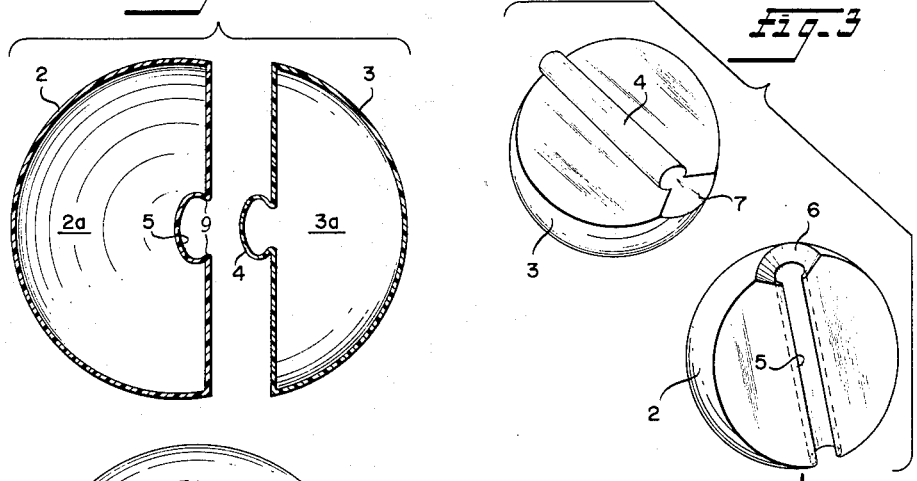
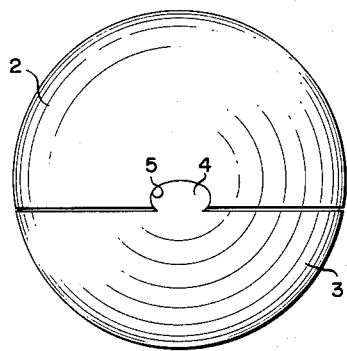
INVENTOR
Rene V. Beverly
BY Ray + Mitchell
ATTORNEYS

United States Patent Office 3,197,914
Patented Aug. 3, 1965

3,197,914
FISHING FLOAT
Rene V. Beverly, 2509 Metairie Court Parkway,
Metairie, La.
Filed Mar. 30, 1964, Ser. No. 355,648
3 Claims. (Cl. 43—44.91)

This invention relates to fishing floats, and more particularly to an improvement in fishing floats which are readily attachable and detachable to and from a fishing line. Fishing floats of this general type are illustrated in the U.S. patent to Parry, 3,043,043.

The principal object of the present invention is to provide a fishing float which is readily attachable to and adjustable along a fishing line without disconnecting the line from the fishing rod or removing any other part attached to the line such as leaders, sinkers, hooks, and lures.

A further object is to provide an improved fishing float which may be attached to or detached from a fishing line without the use of tools.

Another object is to provide an improved fishing float which may be readily and speedily adjusted along the fishing line thereby regulating the depth of a bait.

Still another object is to provide an improved fishing float simple in construction permitting inexpensive manufacture, preferably of plastic or other noncorrosive material.

The invention in the foregoing aspects and in others subsidiary or related thereto will be fully apprehended from the following detailed description of a preferred embodiment thereof, taken in conjunction with the appended drawing, in which:

FIG. 1 is a side view of the assembled float showing a fishing line therethrough;

FIG. 2 is a sectional view of the float taken from FIG. 1 along the line 2—2;

FIG. 3 is an exploded view of the improved fishing float;

FIG. 4 is a bottom view of the assembled fishing float.

Similar reference characters are applied to similar elements throughout the drawing.

Referring now to the drawing, FIG. 1 shows the assembled fishing float, generally indicated by the numeral 1, comprising members 2 and 3. While the float could be made from any solid material lighter than an equal volume of water, the preferred embodiment as illustrated comprises a pair of substantially hemispherical thin-walled members 2, 3 wherein the said walls of necessity define buoyancy chambers 2a, 3a as best seen in FIG. 2. Here again any suitable material may be used, but plastic is preferable from an economic standpoint. While each of the members 2, 3 are substantially hemispherical it will be noted from FIG. 2 that member 2 is thicker than member 3 so that the fishing line 10 passes through the center of the assembled float. The assembled float 1 is substantially spherical but the shape of the float is not critical and may assume other configurations.

The means for holding the two buoyant members together comprise a convex tenon 4 integral with the member 3 and a concave groove or mortise 5 on member 2 corresponding to the tenon 4. The tenon 4 and groove 5 are proportioned so that the members 2 and 3 snap together and thus retain the members 2 and 3 interlocked until forcibly separated. Groove 5 may be provided with flanges 9 to more securely grip and hold tenon 4.

As seen in FIGS. 1 and 3, bevels 6 and 7 are provided on members 2 and 3, respectively, and these bevels define a cleft at the top portion of the float. In contrast, the bottom portion 8 of the float 1 is smooth (see FIG. 4).

In preparing the float for use, the fishing line 10 is placed in the center of the groove 5 of member 2, tenon 4 of member 3 is aligned with the groove 5, and pressure from one hand is exerted on member 3 to snap tenon 4 into groove 5 thereby interlocking the members 2 and 3. FIGS. 1 and 4 illustrate the assembled float.

To remove the float 1 from the line 10, for example to adjust the length of line 10 between the float 1 and hook 11, it is appropriate to grip the float with both hands with the thumbs on the bevels 6, 7 and with the fingers along the bottom 8 of the float. With pressure from both thumbs in opposite directions the tenon 4 will snap out of groove 5 thereby releasing the members 2 and 3.

From the foregoing it will be apparent to those skilled in the art that there is shown and described herein a novel and useful fishing float having numerous advantages over the prior art. While for purposes of description there has been shown and described a specific embodiment of this invention, it will be apparent that changes and modifications can be made therein without departing from the spirit of my invention or the scope of the appended claims.

I claim:
1. A separable spherical shaped fishing line float comprising: first and second hemispherically shaped buoyant members; a mortise on said first buoyant member, the lateral thickness of said first buoyant member being greater than the lateral thickness of said second buoyant member by an amount substantially equal to the depth of said mortise in said first buoyant member, the bottom of said mortise extending along a diameter of the assembled first and second members; and a tenon on said second buoyant member, said mortise and tenon providing means for assembly and disassembly of said spherically shaped float.

2. A separable fishing line float according to claim 1 wherein said mortise is provided with gripping flanges.

3. A separable fishing line float according to claim 1 wherein said first and second buoyant members are of plastic material.

References Cited by the Examiner

UNITED STATES PATENTS

| | | | |
|---|---|---|---|
| 239,274 | 3/81 | Schadowsky. | |
| 419,574 | 1/90 | Vasseur | 43—44.92 |
| 1,240,043 | 9/17 | Gregory et al. | 43—44.9 |
| 3,102,359 | 9/63 | Cahill et al. | 43—44.92 X |

SAMUEL KOREN, *Primary Examiner.*